US012482896B2

(12) United States Patent
Sinclair

(10) Patent No.: US 12,482,896 B2
(45) Date of Patent: Nov. 25, 2025

(54) FLOW-THROUGH ELECTROCHEMICAL CELL ELECTRODE WITH PERMEABLE MEMBRANE

(71) Applicant: Paul Lincoln Sinclair, Austin, TX (US)

(72) Inventor: Paul Lincoln Sinclair, Austin, TX (US)

( * ) Notice: Subject to any disclaimer, the term of this patent is extended or adjusted under 35 U.S.C. 154(b) by 709 days.

(21) Appl. No.: 17/789,449

(22) PCT Filed: Mar. 11, 2021

(86) PCT No.: PCT/US2021/022001
§ 371 (c)(1),
(2) Date: Jun. 27, 2022

(87) PCT Pub. No.: WO2021/183826
PCT Pub. Date: Sep. 16, 2021

(65) Prior Publication Data
US 2023/0042720 A1    Feb. 9, 2023

Related U.S. Application Data

(60) Provisional application No. 62/988,632, filed on Mar. 12, 2020.

(51) Int. Cl.
*H01M 50/417* (2021.01)
*H01M 4/66* (2006.01)
(Continued)

(52) U.S. Cl.
CPC ......... *H01M 50/417* (2021.01); *H01M 4/661* (2013.01); *H01M 4/747* (2013.01);
(Continued)

(58) Field of Classification Search
CPC .... H01M 50/417; H01M 4/661; H01M 4/747; H01M 4/808; H01M 50/426;
(Continued)

(56) References Cited

U.S. PATENT DOCUMENTS

| 4,144,301 A | 3/1979 | Adams et al. |
| 4,731,168 A | 3/1988 | McIntyre |

(Continued)

FOREIGN PATENT DOCUMENTS

| CN | 102916161 A | 2/2013 |
| EP | 2942828 A1 | 11/2015 |

(Continued)

OTHER PUBLICATIONS

PCT International Search Report and the Written Opinion of the International Application No. PCT/US2020/20736; mailing date Jun. 10, 2020, 9 pages.

(Continued)

*Primary Examiner* — Lisa S Park
(74) *Attorney, Agent, or Firm* — McDermott Will & Schulte LLP

(57) ABSTRACT

The present disclosure provides a porous electrode for a flow-through rechargeable electrochemical cell including a high-porosity metal current collector, an active material surrounding the metal current collector, and a self-supporting synthetic membrane material surrounding the active material. The present disclosure further includes a flow-through rechargeable battery including multiple electrochemical cells, a closed loop, and a pump.

10 Claims, 3 Drawing Sheets

(51) Int. Cl.
- *H01M 4/74* (2006.01)
- *H01M 4/80* (2006.01)
- *H01M 50/426* (2021.01)
- *H01M 4/02* (2006.01)

(52) U.S. Cl.
CPC ......... *H01M 4/808* (2013.01); *H01M 50/426* (2021.01); *H01M 2004/021* (2013.01)

(58) Field of Classification Search
CPC .. H01M 2004/021; H01M 4/62; H01M 4/806; H01M 10/345; H01M 4/13; Y02E 60/10
See application file for complete search history.

(56) References Cited

U.S. PATENT DOCUMENTS

| | | | |
|---|---|---|---|
| 5,705,051 A | 1/1998 | Coin et al. | |
| 6,280,878 B1 | 8/2001 | Maruyama et al. | |
| 6,287,720 B1 | 9/2001 | Yamashita et al. | |
| 9,461,298 B2 | 10/2016 | Suppes | |
| 2009/0155678 A1 | 6/2009 | Less et al. | |
| 2011/0223450 A1 | 9/2011 | Horme | |
| 2011/0244277 A1 | 10/2011 | Gordon, II et al. | |
| 2012/0082873 A1 | 4/2012 | Fischel | |
| 2013/0187618 A1 | 7/2013 | Suppes | |
| 2013/0189592 A1 | 7/2013 | Roumi et al. | |
| 2015/0236363 A1 | 8/2015 | Polcyn et al. | |
| 2015/0263358 A1* | 9/2015 | Zaffou | H01M 8/20 429/81 |
| 2015/0263379 A1 | 9/2015 | Xiao et al. | |
| 2016/0260549 A1 | 9/2016 | Chen | |
| 2017/0025697 A1 | 1/2017 | Williams | |
| 2018/0034038 A1* | 2/2018 | Rogren | H01M 4/0471 |
| 2018/0205067 A1 | 7/2018 | Markiewicz et al. | |
| 2018/0342751 A1 | 11/2018 | Klassen | |
| 2020/0251783 A1* | 8/2020 | Shimizu | H01M 4/043 |
| 2022/0020974 A1* | 1/2022 | Yersak | H01M 50/46 |

FOREIGN PATENT DOCUMENTS

| | | |
|---|---|---|
| JP | H05-290856 | 11/1993 |
| JP | 2003-511830 | 3/2003 |
| JP | 2011146224 A | 7/2011 |
| JP | 2017-117617 | 6/2017 |
| WO | 2013174149 A1 | 11/2013 |
| WO | WO2016158663 * | 10/2016 |
| WO | 2017/096258 | 6/2017 |

OTHER PUBLICATIONS

PCT International Preliminary Report on Patentability of International Application No. PCT/US2020/20736; mailing date Sep. 16, 2021, 8 pages.
Taiwan Office Action and Search Report, Application No. 109106977, 9 pages, Nov. 23, 2023.
Taiwan Office Action, Application No. 109106977, 9 pages, Jul. 3, 2024 (with English translation).
European Search Report, Application No. 20765562.2, 9 pages, Nov. 27, 2024.
International Bureau, International Preliminary Report On Patentability for International Application No. PCT/US2021/022001, Mailing Date: Sep. 22, 2022, 11 Pages.
International Searching Authority, International Search Report and Written Opinion for International Application No. PCT/US2021/022001, Mailing Date: May 18, 2021, 10 Pages.
Japanese Office Action, Application No. 2022-554532, 11 pages, Mar. 5, 2025 (English Translation).
Extended European Search Report received for Europe Patent Application No. 21768536.1, mailed May 12, 2025; 9 pages.

* cited by examiner

FLOW-THROUGH ELECTROCHEMICAL CELL ELECTRODE WITH PERMEABLE MEMBRANE

CROSS-REFERENCE TO RELATED APPLICATIONS

The present application is a U.S. National Stage Application of International Application No. PCT/US2021/022001 filed Mar. 11, 2021, which claims the benefit of the following U.S. Provisional Applications: U.S. Provisional Applications Ser. No. 62/988,632, filed Mar. 12, 2020, entitled FLOW-THROUGH ELECTROCHEMICAL CELL ELECTRODE WITH PERMEABLE MEMBRANE, which are incorporated herein by reference in the entirety.

TECHNICAL FIELD

The present disclosure generally relates to a rechargeable electrochemical cell and in particular, to electrodes for flow-through electrochemical cells.

BACKGROUND

An electrochemical cell has two electrodes, the anode and the cathode, and an electrolyte. The electrodes include materials, referred to as active materials, that are both electronically active and chemically active. The active materials in the anode and cathode are able to gain and lose ions, typically the same ion, which is a cation (positive ion) referred to as the working ion of the electrochemical cell. The electrolyte conducts the working ion, but is an electronic insulator. As a result, any movement of electrons between the anode active material and the cathode active material must take place through an external circuit that is in electronic contact with both the anode and the cathode. Typically, the anode active material, the cathode active material, or both contain the working ion prior to cycling of the electrochemical cell.

A rechargeable electrochemical cell or rechargeable battery is typically identified by type based on its working ion, leading to identifications such as "lithium ion battery," "hydrogen ion battery," etc.

During cycling, the electrolyte conducts the working ion inside the electrochemical cell, while electrons move through the external circuit. Electrons tend to flow without requiring an external energy input during discharge, allowing energy stored in the electrochemical cell to, for example, power a device. During charge, an external energy supply is typically used to cause electrons to flow in the opposite direction, reversing the flow of the working ion and storing energy from the energy supply in the electrochemical cell.

SUMMARY

The present disclosure provides an electrode for a flow-through rechargeable electrochemical cell including a high-porosity metal current collector, an active material surrounding the metal current collector, and a self-supporting synthetic membrane material surrounding the active material.

The electrode may further include the following features, which may be combined with one another in any combinations and with other features disclosed in the present specification, unless clearly mutually exclusive:

i. the high-porosity metal current collector may be a metal foam;
ii. the high-porosity metal current collector may be a woven-wire-mesh;
iii. the synthetic membrane may completely coat the active material;
iv. the synthetic membrane may comprise a polymer;
v. the synthetic membrane may comprise a polymer resin;
vi. the synthetic membrane may comprise a semi-crystalline polyolefin;
vii. the synthetic membrane may comprise polyoxymethylene;
viii. the synthetic membrane may comprise isotactic poly (4-methyl-1-pentene);
ix. the synthetic membrane may comprise ethylene propylene diene monomer rubber;
x. the synthetic membrane may comprise polyethylene;
xi. the synthetic membrane may comprise polypropylene;
xii. the synthetic membrane may comprise a graft polymer;
xiii. the synthetic membrane may consist of polyethylene;
xiv. the synthetic membrane may consist of polypropylene;
xv. the synthetic membrane may comprise polyvinylidene fluoride;
xvi. the synthetic membrane may comprise a fluoropolymer elastomer;
xvii. the metal current collector may have a porosity between 80 and 90%;
xviii. the active material may be a cathode active material; and
xix. the active material may be an anode active material.

The present disclosure provides a cathode for a flow-through rechargeable electrochemical cell including a high-porosity metal current collector, a cathode active material surrounding the metal current collector, and a self-supporting synthetic membrane material surrounding the cathode active material.

The cathode may further include the following features, which may be combined with one another in any combinations and with other features disclosed in the present specification, unless clearly mutually exclusive:

i. the high-porosity metal current collector may be a metal foam;
ii. the high-porosity metal current collector may be a woven-wire-mesh;
iii. the synthetic membrane may completely coat the active material;
iv. the synthetic membrane may comprise a polymer;
v. the synthetic membrane may comprise a polymer resin;
vi. the synthetic membrane may comprise a semi-crystalline polyolefin;
vii. the synthetic membrane may comprise polyoxymethylene;
viii. the synthetic membrane may comprise isotactic poly (4-methyl-1-pentene);
ix. the synthetic membrane may comprise ethylene propylene diene monomer rubber;
x. the synthetic membrane may comprise polyethylene;
xi. the synthetic membrane may comprise polypropylene;
xii. the synthetic membrane may comprise a graft polymer;
xiii. the synthetic membrane may consist of polyethylene;
xiv. the synthetic membrane may consist of polypropylene,
xv. the synthetic membrane may comprise polyvinylidene fluoride;
xvi. the synthetic membrane may comprise a fluoropolymer elastomer; and xvii. the metal current collector may have a porosity between 80 and 90%.

The present disclosure provides an anode for a flow-through rechargeable electrochemical cell including a high-porosity metal current collector, an active material surrounding the metal current collector, and a self-supporting synthetic membrane material surrounding the anode active material.

The anode may further include the following features, which may be combined with one another in any combinations and with other features disclosed in the present specification, unless clearly mutually exclusive:

i. the high-porosity metal current collector may be a metal foam;
ii. the high-porosity metal current collector may be a woven-wire-mesh;
iii. the synthetic membrane may completely coat the active material;
iv. the synthetic membrane may comprise a polymer;
v. the synthetic membrane may comprise a polymer resin;
vi. the synthetic membrane may comprise a semi-crystalline polyolefin;
vii. the synthetic membrane may comprise polyoxymethylene;
viii. the synthetic membrane may comprise isotactic poly (4-methyl-1-pentene);
ix. the synthetic membrane may comprise ethylene propylene diene monomer rubber;
x. the synthetic membrane may comprise polyethylene;
xi. the synthetic membrane may comprise polypropylene;
xii. the synthetic membrane may comprise a graft polymer;
xiii. the synthetic membrane may consist of polyethylene;
xiv. the synthetic membrane may consist of polypropylene,
xv. the synthetic membrane may comprise polyvinylidene fluoride;
xvi. the synthetic membrane may comprise a fluoropolymer elastomer; and
xvii. the metal current collector may have a porosity between 80 and 90%.

BRIEF DESCRIPTION OF THE DRAWINGS

Embodiments of the present disclosure are described by way of example in greater detail with reference to the attached figures, which are not necessarily to scale, and in which.

DETAILED DESCRIPTION

The present disclosure relates to electrodes with permeable membranes for rechargeable electrochemical cells.

A rechargeable electrochemical cell is a device that may undergo at least one charge/discharge cycle. The terms "battery" and "electrochemical cell" are sometimes used interchangeably or given particular meanings in different contexts. The term "electrochemical cell" is used in the present disclosure to describe a device including one anode, one cathode, and an electrolyte. The term "battery" is used in the present disclosure to describe a device containing a plurality of electrochemical cells.

Electrochemical cells of the present disclosure may have a porous cathode and anode, a separator that allows fluid flow, and a pump to circulate a fluid electrolyte through the electrochemical cell. The working ion may be an alkali metal ion, such as lithium ion ($Li^+$), sodium ion ($Na^+$), or potassium ion ($K^+$), hydrogen ion ($H^+$), or hydroxyl ion ($OH^-$).

Figure 1A:
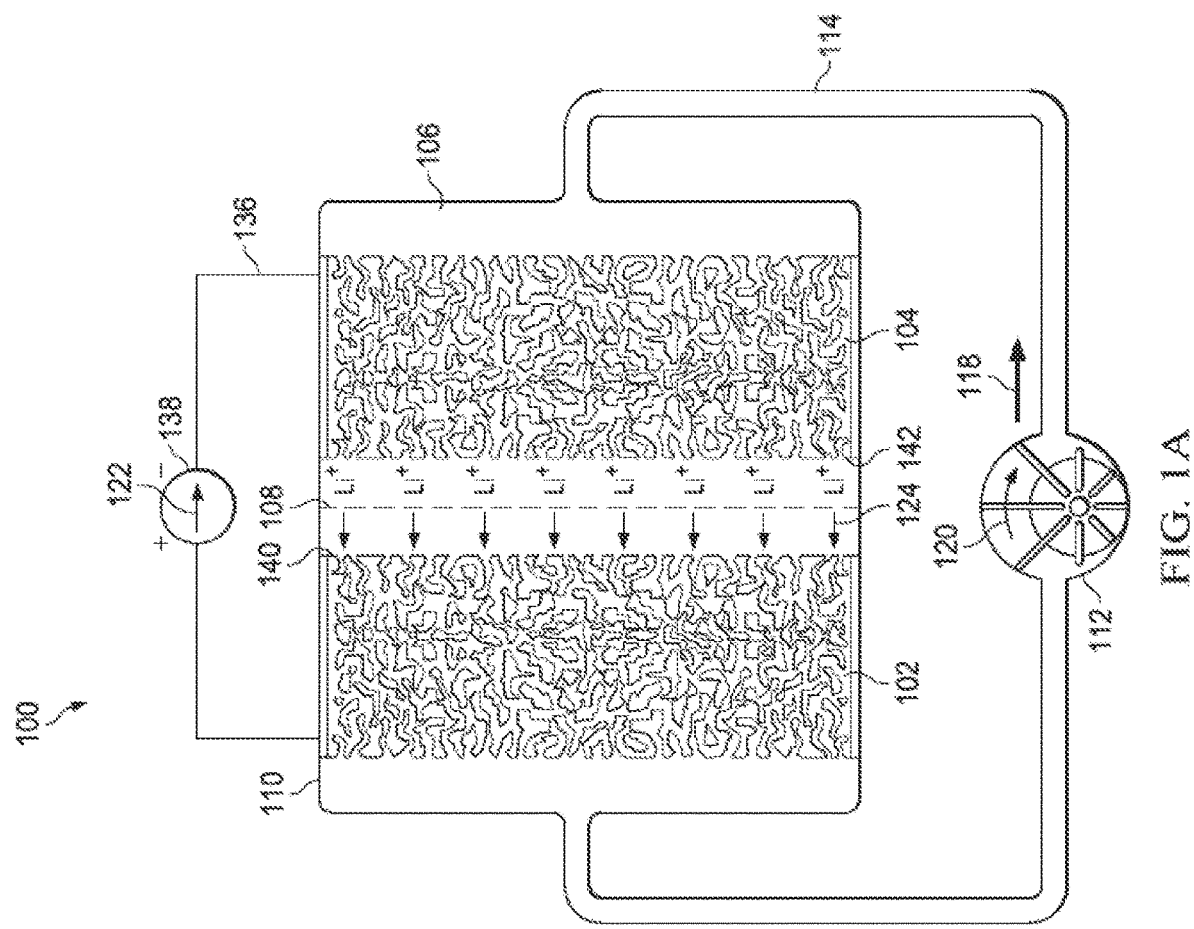
FIG. 1A is a cross-sectional schematic diagram of a flow-through rechargeable electrochemical cell during discharge.
Figure 1B:
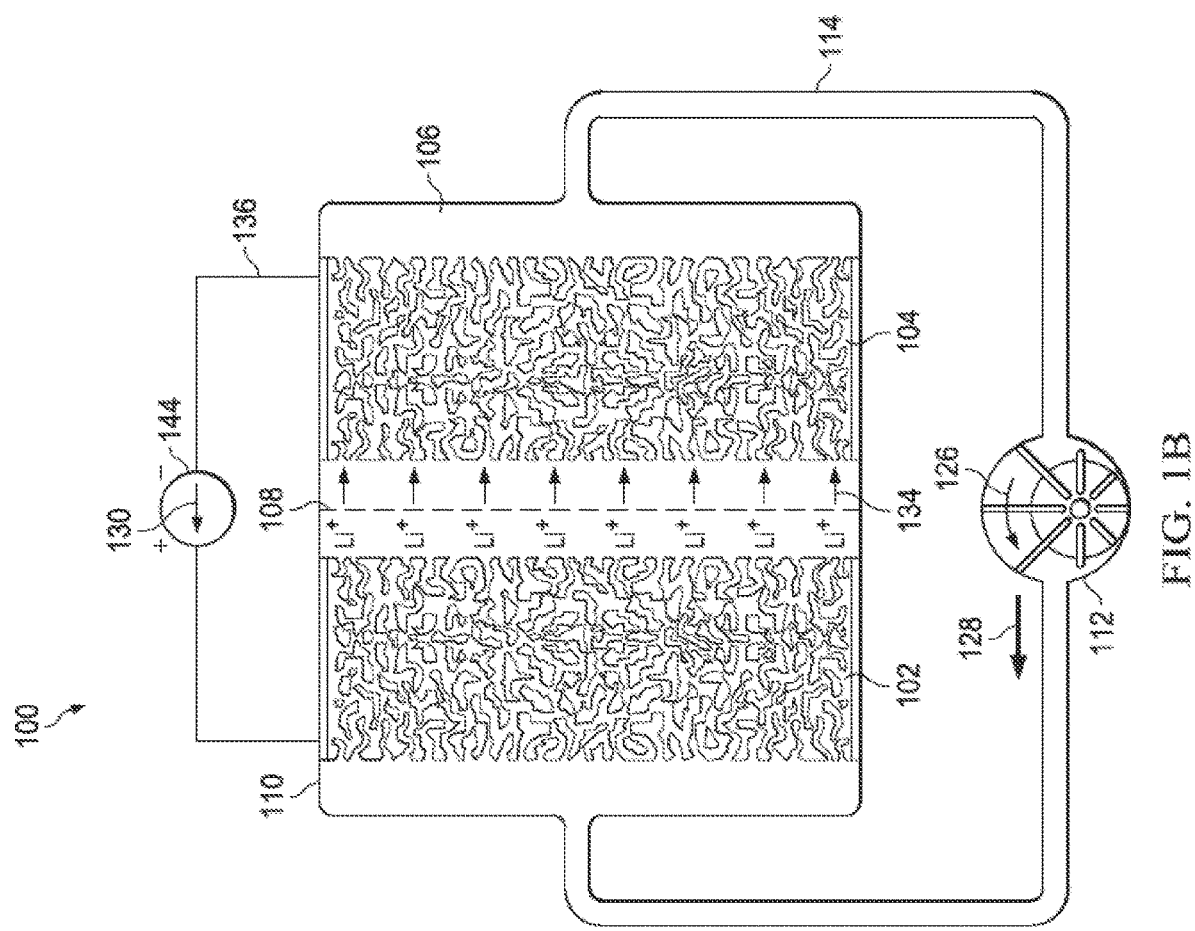
FIG. 1B is a cross-sectional schematic diagram of the flow-through rechargeable electrochemical cell of FIG. 1A during charge.

Referring now to FIGS. 1A and 1B, electrochemical cell 100 includes a cathode 102, an anode 104, an electrolyte 106, and an electronically insulating separator 108 housed in a container 110. To facilitate flow of the electrolyte 106 through the cathode 102 and the anode 104, the container 110 is fluidly connected to a closed loop 114 which includes a pump 112.

As illustrated in FIGS. 1A and 1B, the electrochemical cell is configured such that the electrodes and separator 108 are arranged in a stack in which the separator 108 is located between the anode 104 and the cathode 102 in order to help prevent electronic contact between the anode 104 and the cathode 102 other than through the external circuit 136. The closed loop 114 is connected to the container 110 such that the fluid electrolyte enters the container 110 from the closed loop 114, flows through the stack of the anode 104, the separator 108, and the cathode 102, then leaves the container 110 to re-enter the closed loop 114. As illustrated in FIGS. 1A and 1B, the closed loop 114 is connected to the container 110 on opposite sides of the stack, but other configurations are possible so long as the fluid flows through the stack.

Although the electrochemical cell 100 illustrated in FIGS. 1A and 1B contains a separator 108, alternative electrochemical cells may lack a separator. For example, the cathode 102 and the anode 104 may be held in place by attachment to the container 110 or another non-separator structure within the electrochemical cell 100 such that they are not in electronic contact. Although such a configuration, lacking a separator, may not function in many conventional electrochemical cells due to the formation of dendrites which are blocked by a separator, the flow of the fluid electrolyte through the electrochemical cell 100 may prevent or substantially decrease dendrite formation as compared to a similar electrochemical cell that is not a flow-through cell, making a separator unnecessary.

Although the electrochemical cell 100 is illustrated with a cylindrical container 100, other container shapes, such as cuboid, cubic, or coin-shaped are possible. Container 100 may include any suitable material able to resist degradation by the fluid electrolyte or other chemicals found within the electrochemical cell 100, including chemicals formed during cycling of the electrochemical cell 100. A suitable material may also be able to maintain the shape of the electrochemical cell 100 during charge and discharge or over the expected life of the electrochemical cell 100. Suitable materials include steel, glass, bituminous compounds, ceramic materials, and polymers. The container 110 may include multiple materials, such as, for example, a metal outer layer with a degradation-resistant lining or coating.

The closed loop 114 may include the same material as the container 100, or a different material. The closed loop 114 may include any suitable material able to resist degradation by the fluid electrolyte or other chemicals found within the electrochemical cell 100, including chemicals formed during cycling of the electrochemical cell 100. A suitable material may also be able to maintain a shape, such as a cross-sectional shape without collapse, over the expected life of the electrochemical cell 100. Suitable materials include steel, glass, bituminous compounds, ceramic materials, and polymers. The closed loop 114 may include multiple materials, such as, for example, a metal outer layer with a degradation-resistant lining. The closed loop 114 may be flexible or rigid.

The pump 112 in closed loop 114 may be any pump sufficient to cause the fluid electrolyte 106 to flow through the closed loop 114 and the electrodes in the container 110 and to be reversible to cause flow in one direction during charge and the opposite direction during discharge. The pump 112 may be a positive-displacement pump, as illustrated, a peristaltic pump, a rotary-vane type pump, or progressive-cavity pump. The pump 112 may be located within the fluid flow passage of the closed loop 114, as illustrated, or it may be an external pump, such as a peristaltic pump. The pump 112 may operate at a fixed flow rate or a variable flow rate.

Flow rates in the closed loop 114 may be measured as a linear flow rate through the electrodes or a volumetric flow rate through the electrodes. If the theoretically linear flow rate differs between the two electrodes, the lower linear flow rate will dictate the actual linear flow rate through the electrodes. The linear flow rate may be dictated by a number of factors, such as the pump 112 and permeability of the electrodes and separator (if present) to the fluid electrolyte 106.

In general, peristaltic pumps or rotary-vane type pumps can provide a low or moderate flow rate of with modest power requirements. Progressive-cavity pumps can provide higher flow rates with higher power requirements. Due to their higher power requirements, progressive-power pumps may be more suitable for use in flow-through electrochemical cells in large stationary batteries, such as in grid storage and other electric utility applications, or in ship batteries.

The pump 112 may be powered by an external power supply while electrochemical cell 100 is being charged, discharged, or both. In particular, the pump 112 may be powered by the same external energy supply, such as charger 144, during charge. The pump 112 may be powered by the electrochemical cell 100 itself during discharge. The pump 112, particularly if within closed loop 114, may include electronically insulating components so that the electrochemical cell 100 cannot discharge except through the external circuit 136. The pump 112 may also be a positive-displacement type pump, such as a peristaltic pump, that physically isolates short sections of electrolyte, thereby physically interrupting a possible electronic circuit along the closed loop 114.

If the pump 112 is located within the fluid flow passage of the closed loop 114, the pump 112 may include or be coated with a material able to resist degradation by the fluid electrolyte or other chemicals found within the electrochemical cell 100, including chemicals formed during cycling of the electrochemical cell 100.

Although FIGS. 1A, and 1B are illustrated with a single pump 112, multiple pumps may be present. For example, a battery containing a plurality of electrochemical cells may contain pumps between electrochemical cells or sets of electrochemical cells to maintain flow of the fluid electrolyte, particularly if a large number of electrochemical cells are present, or the permeability of each cell is not high. A plurality of pumps 112 may be driven by one motor to help them remain in sync, or by a plurality of motors.

The separator 108 may be a permeable membrane that allows passage of the working ion and flow of the fluid electrolyte 106 through the membrane. The separator 108 may include woven fibers, nonwoven fibers, polymer films, ceramics, and naturally occurring substances. Nonwoven fibers may include cotton, nylon, polyester fibers, papers, and glass fibers. Polyester films may include polyethylene, polypropylene, poly(tetrafluoroethylene), poly(ethylene terephthalate), and polyvinyl chloride films. Naturally occurring substances may include rubber, asbestos, and wood. The separator 108 may be between 10 µm and 5000 µm thick, between 10 µm and 1000 µm thick, between 10 µm and 500 µm thick, between 10 µm and 100 µm thick, or between 20 µm and 70 µm thick, which thinner separators being most useful in many electrochemical cells 100.

The cathode 102 may be a porous cathode. The cathode 102 may include a cathode high-porosity metal current collector, such as a metal foam that is permeable to the fluid electrolyte. The cathode high-porosity metal current collector is an electronic conductor and provides a path for electrons to flow between the cathode active material and an external electric circuit. The cathode high-porosity metal current collector also generally provides mechanical support for the cathode active material. Suitable high-porosity metal foams include Ni, Fe, Cu, and Al foams. The porosity of the cathode high-porosity metal current collector may be greater than 40%, such as between 40% and 90% or between 40% and 99%. In particular, the porosity may be between 80% and 90%. The porous nature also allows the fluid electrolyte 106 to flow through the cathode 102.

The cathode high-porosity metal current collector may be coated with a cathode active material. In particular, the pore surfaces of the cathode high-porosity metal current collector may be coated with the cathode active material. After coating with the cathode active material, the cathode 102 may still maintain a porosity of at least 5%, at least 10%, or at least 20%, such as between 5% and 50%, between 10% and 50%, and between 20% and 50%, or a porosity sufficient to allow flow of the fluid electrolyte 106 at a set linear or volumetric flow rate.

The cathode active material may be coated with a synthetic membrane material to form a permeable synthetic membrane around the cathode active material. The permeable synthetic membrane may provide structural support to the cathode active material. The permeable synthetic membrane may prevent disintegration of the cathode active material by holding the cathode active material in place on the cathode high-porosity metal current collector. Exemplary membrane materials, methods of forming the membrane, and membrane structures are discussed in more detail below.

The anode 104 may be a porous anode. For example, the anode 104 may include an anode high-porosity metal current collector, such as a high-porosity metal foam that is permeable to the fluid electrolyte. The anode high-porosity metal current collector is an electronic conductor and provides a path for electrons to flow between the anode active material and an external electric circuit. The anode high-porosity metal current collector also generally provides mechanical support for the anode active material. Suitable high-porosity metal foams include Ni, Fe, Cu, and Al foams. The porosity of the anode high-porosity metal current collector may be greater than 40%, such as between 40% and 90% or between 40% and 99%. In particular, the porosity may be between 80% and 90%. The porous nature also allows the fluid electrolyte 106 to flow through the anode 104.

The anode high-porosity metal current collector may be coated with an anode active material. In particular, the pore surfaces of the anode high-porosity metal current collector may be coated with the anode active material. After coating with the anode active material, the anode 104 may still maintain a porosity of at least 5%, at least 10%, or at least 20%, such as between 5% and 50%, between 10% and 50%, and between 20% and 50%, or a porosity sufficient to allow flow of the fluid electrolyte 106 at a set linear or volumetric flow rate.

The anode active material may be coated with a synthetic membrane material to form a permeable synthetic membrane around the anode active material. The permeable synthetic membrane may provide structural support to the anode active material. The permeable synthetic membrane may prevent disintegration of the anode active material by holding the anode active material in place on the anode high-porosity metal current collector. Exemplary membrane materials, methods of forming the membrane, and membrane structures are discussed in more detail below.

In conventional electrochemical cells and batteries, swelling and physical distortion of the cathode and anode and particularly of the cathode and anode active materials during electrochemical cell cycling can cause physical damage to the electrochemical cell, such as disconnects between the active materials and other electronically conductive materials present in the electrochemical cell. The volumetric changes can also result in distortion of the electrode itself, as well as disintegration of the active material into a loose powder, which may fall away from the electrode. This causes performance declines over multiple cycles. For example, the electrochemical cell may experience a decrease in capacity over multiple cycles.

In general, it is also desirable to maximize the energy density of a cell by maximizing the volume of active material and to design the material so that it absorbs or releases the maximum amount of mobile ions per unit volume of the electrode. Expansion and contraction of the active materials volume may be significant, and can range from a minimum of 5% to as high as 50%. Silicon anode material, as used in some lithium-ion cells in the current state of the art, for example, have very high volumetric change and suffer decreased performance over multiple cycles.

FIG. 1A illustrates an electrochemical cell 100 during discharge when the active material is an alkali metal ion active material. The fluid electrolyte 106 is pumped in direction 118 by the positive-displacement pump 112 rotating in direction 120. Electrons are conducted along external circuit 136 in direction 122 through electrical load 138, such as a device being powered by the electrochemical cell 100. The working ion, in this example lithium ion, is conducted in direction 124 between the anode 104 and the cathode 102. Electrochemical reactions in the anode 104 free lithium ions from the anode active material, while electrochemical reactions in the cathode 102 capture lithium ions in the cathode active material.

FIG. 1B illustrates and electrochemical cell 100 during charge when the active material is an alkali metal ion active material. The fluid electrolyte 106 is pumped in direction 128, which is opposite direction 118, by the positive-displacement pump 112 rotating in direction 126. Electrons are conducted along external circuit 136 in direction 130 through charger 144, which may be connected to an external power source. The working ion, in this example lithium ion, is conducted in direction 134, which is opposite direction 124, between the cathode 102 and the anode 104. Electrochemical reactions in the cathode 102 free lithium ions from the cathode active material, while electrochemical reactions in the anode 104 capture lithium ions in the anode active material.

Flow of the fluid electrolyte 106 through the anode 104 and the cathode 102, also in direction 124, or flow of the fluid electrolyte 106 through the cathode 102 and the anode 104, also in direction 134, magnifies the effective ionic mobility of the working ion in the anode 104, the cathode 102, or, typically, both, with flow at higher rates having a greater effect. Higher working ion mobility in one or both electrodes may reduce ohmic losses in the electrolyte during charge, discharge or, typically, both.

Permeable Synthetic Membranes

The active materials may be covered by a permeable synthetic membrane. The membrane may be made of a membrane material. The membrane may cover the entire surface of the active material. The membrane may be mechanically strong but allows for the free conduction of ions between the electrode and the electrolyte. Membranes of this type may also be described as "semi-permeable," meaning that only certain specified ion species are able to traverse the membrane material. For example, some membranes may allow hydrogen ions (i.e. protons) to pass, but not hydroxyl ions. The membrane may be made of the same type and thickness as that known in the art for use in the separator.

The membrane may be "self-supporting." A self-supporting membrane is a membrane that provides support for the active material. A self-supporting membrane maintains contact with the active material even when the active material expands or contracts during charge or discharge. A self-supporting membrane may expand and contract along with the active material.

The membrane may be formed on the active material by dissolving the membrane material in a liquid solvent, resulting in a low-viscosity liquid that can impregnate the electrode. The solvent may then be removed by drying and heating, which deposits the membrane material on the active material, forming the membrane. The concentration of the membrane material in the solution may be used to determine the final thickness of the membrane. The thickness may be in the range of 0.01 to 10 micron.

The membrane material may be a polymer resin. Polymer resins are used because they retain flexibility and elasticity after polymerization. Exemplary polymer resins may include, but are not limited to: semi-crystalline polyolefins, polyoxymethylene, and isotactic poly (4-methyl-1-pentene). Blends of immiscible polymers, in which at least one polymer has a crystalline structure, such as polyethylene-polypropylene, polystyrene-polypropylene, poly (ethylene terephthalate)-polypropylene blends, and ultrahigh-molecular-weight polyethylene may also be used.

Polymer resins may be deposited on the active material by using a wet process. A wet process includes mixing, heating, impregnating, and additive removal steps. Polymer resins may be first mixed with paraffin oil, antioxidants, and other additives such as place-holder powders. The mixture may then be heated to produce a homogenous solution. The heated solution may be injected into the pores of the electrode to make a gel-like film coating the active material, and then dried and cured. A vacuum-impregnation process may also be used to eliminate the possibility of air pockets in the pores of the electrode which may prevent complete coating. The place-holder additives may then be removed with a volatile solvent to form a microporous film coating.

Wet processes may also be suitable for both crystalline and amorphous polymers. Some polymers may impart favorable mechanical properties onto the membrane such as shutting down cell operation when they become too hot. Polymers appropriate for use as a membrane material may include polyolefin based materials with semi-crystalline structure. Polyolefin materials with semi-crystalline structures may include, but are not limited to: polyethylene, polypropylene, and their blends such as polyethylene-polypropylene.

Membrane materials may also include graft polymers. For example, micro-porous poly(methyl methacrylate)-grafted and siloxane grafted polyethylene may be a membrane material. These graft polymers may demonstrate favorable surface morphology and electrochemical properties compared to conventional polyethylene. In another example, polytriphenylamine (PTPAn)-modified membrane materials are electroactive, which may provide reversible overcharge protection. In yet another example, polyvinylidene fluoride (PVDF) nanofiber webs may be used as membrane materials to improve both ion conductivity and dimensional stability.

Methods of forming the membrane may also include solution-based processing and aqueous emulsion polymerization. In solution-based processing, typical organic solvents may include, but are not limited to, dimethylformamide and butanone. In aqueous emulsion polymerization, the fluorosurfactant perfluorononanoic acid may be used in anion form as a processing aid by solubilizing monomers. This process can be used to simultaneously deposit PVDF on the surface of the active material and polymerize the PVDF to form the membrane.

PVDF membranes may also be used to mechanically stabilize an active material that may be in the form of a finely divided powder. A solution of 1-2% PVDF by mass in N-methyl-2-pyrrolidone (NMP) may be mixed with the active material powder, and may also be mixed with a conductive additive, such as carbon black, carbon nanofibers, or metal powders, to form a slurry that may be used to impregnate the metal foam current collector. The NMP may then be evaporated to form a composite electrode. PVDF may be used because it is chemically inert over the electrode potential ranges used and does not chemically react with common electrolytes.

PVDF may also be used because it is a thermoplastic material with high resistance to chemical modification. It is compatible with strong acids, weak acids, ionic salt solutions, halogenated compounds, hydrocarbons, aromatic solvents, aliphatic solvents, oxidants, and weak bases. However, it exhibits chemical sensitivity with strong bases, esters, and ketones.

Synthetic rubbers such as Viton, a fluoroelastomer, may also be membrane materials. Synthetic rubbers are elastic and may be used as a membrane for active materials that exhibit large volumetric swelling. Viton fluoroelastomers are a family comprising copolymers of hexafluoropropylene (HFP) and vinylidene fluoride (VDF or VF2), terpolymers of tetrafluoroethylene (TFE), vinylidene fluoride (VDF) and hexafluoropropylene (HFP); and perfluoromethylvinylether (PMVE)-containing copolymers. The fluorine content of the most common grades varies between 66 and 70%.

Viton is generally compatible with concentrated inorganic acids and bases. It is tolerant of most hydrocarbons. Because it is soluble in acetone, methyl ethyl ketone, and ethyl acetate, each of those solvents may be used to deposit Viton on active materials to form the membrane using a wet process as previously described.

Fluorovinylmethylsiloxane rubber (FVMQ) may be used as a membrane material for NiMH cells using a KOH electrolyte. FVMQ is generally quite tolerant of strongly alkaline solutions. Because FVMQ is soluble in ketones, ketones may be used as a solvent for depositing FVMQ on the active material to form the membrane using a wet process as previously described.

Electrode with Permeable Membrane Design

The membrane may be self-supporting and unlikely to detach from the electrode under repeated cycles of charging and discharging. For example, if the metal current collector is a metal foam, the active material may surround each web of the foam. Then, the membrane may also surround each web of the foam, forming a closed loop. The closed loop may prevent detachment of the membrane from the metal current collector.

Woven-wire-mesh electrodes are also amenable to coating with a membrane that retains mechanical integrity through many cycles of charging and discharging.

Figure 2A:
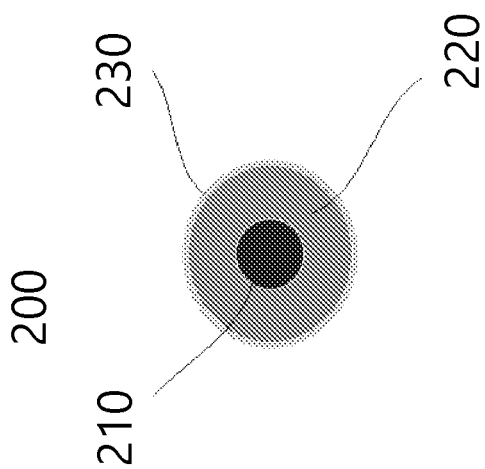
FIG. 2A is a cross-sectional schematic diagram view of a wire of a woven-wire-mesh electrode.

FIG. 2A is a cross-sectional view of wire 200 of a woven wire mesh electrode. Metal current collector 210 forms the core of wire 200, and active material 220 surrounds metal current collector 210. Membrane 230 surrounds active material 220, forming a closed loop that prevents detachment of membrane 230.

Figure 2B:
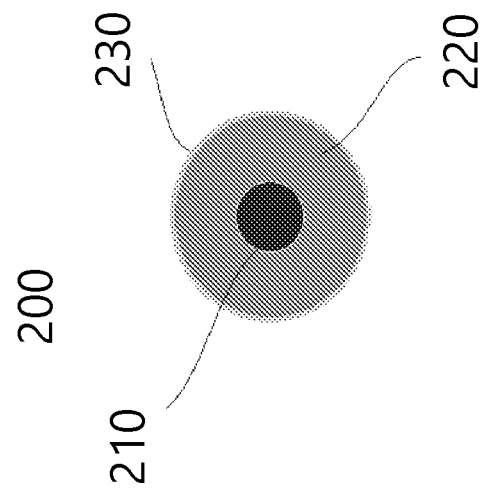
FIG. 2B is a cross-sectional schematic diagram view of the wire of a woven-wire-mesh electrode after expansion.

FIG. 2B is a cross-sectional view of wire 200 of a woven wire mesh electrode after deposition of additional active material resulting from charge or discharge. The amount of active material 220 surrounding metal current collector 210 is greater than in FIG. 2A, and membrane 230 has stretched to accommodate the expansion of active material 220. The stretching of membrane 230 keeps active material 220 in place on metal current collector 210.

The expansion happens, for example, in the active material used in the anode of a lithium-ion cell during the charging process when lithium ions are being intercalated into the active material. The membrane may expand with increasing volume of active material without detaching from it, and increasing the integrity of the electrode.

While FIGS. 2A and 2B show a porous electrode including a woven wire mesh current collector, the porous electrode may have different forms of current collector. For example, the porous electrode may include a metal foam current collector. The metal foam current collector may have a porosity of between 80 to 90%. Similarly, the porous electrode may include a 3D-printed metal current collector.

The combinations of cathode active material, anode active material, and electrolyte may be based on known electrochemical cell principles so that the working ion may participate in electrochemical reactions that allow the electrochemical cell to function. For example, the anode and cathode may give rise to a given theoretical voltage, and the electrolyte may be an electrolyte that is expected to be stable at that given voltage.

EXAMPLE

The following examples are provided to further illustrate the principles and specific aspects of the invention. They are not intended to and should not be interpreted to encompass the entire breadth of all aspects of the invention.

Example 1: Nickel Metal-Hydride (NiMH) Cell Electrode

A porous electrode with a permeable membrane may be constructed as illustrated in FIGS. 2A and 2B.

First, the metal current collector is made from a nickel foam sheet having a pore density of 110 pores per inch (PPI). The typical pore size in the nickel foam sheet ranges from 100 μm at the 10$^{th}$ percentile to 500 μm at the 90$^{th}$ percentile, with the most common size being 230 μm at the 50$^{th}$ percentile. The nickel metal forms a fine random mesh with wire diameters in the range of 50 μm to 150 μm.

The metal current collector is then uniformly coated with active material to a thickness of 22 μm to 74 μm to maximize the volume of active material in a given volume of electrode, while maintaining an acceptable open volume to allow electrolyte to pass through.

Then, active material is made by grinding solid cast material into a powder. The resulting powder has a range of particle sizes. The powder is then passed through a cascade of progressively finer sieves to classify the powder into size intervals. The powders are classified according to the mesh size of the sieve that collects the powder. For example, a powder that is collected by a sieve with 400 wires/inch mesh (i.e. 400 mesh) is classified as "+400". A powder that is graded "−400+600" has a particle size ranging from 22 μm to 38 μm, while a coarser powder graded as "−200+400" has a range of 38 μm to 74 μm. In this embodiment, both −400+600 and −200+400 may be used. Using a given size range may result in a fixed and predictable final thickness of active material deposited on the metal foam.

The powder is then mixed with a solution of polyvinyl alcohol (PVA) in distilled water in a proportion of between 2% and 20% PVA/water by weight. The PVA is dissolved by adding the PVA to water at 90° C. while continuously stirring the mixture with a magnetic stirring rod, and then allowing the PVA to dissolve into the solution for one hour. To deposit the active material on the metal current collector, the metal current collector is lowered into the mixture and slowly withdrawn, followed by air-drying. Graphite powder and/or pure nickel powder of a very fine particle size in the range 0.005-5 μm may be added to the PVA/water solution to aid in making good electrical contact between the active material and the nickel foam.

After the metal current collector is coated with the active material, the active material is coated with a membrane. A solution of uncured or partly cured ethylene propylene diene monomer (EPDM) rubber is dissolved in perchloroethylene (PERC) while heating to 60° C. for 1-2 hours in a closed flask with a condenser attached to recover vaporized PERC. The solution is 1-10% by weight EPDM/PERC, which may be adjusted to control the thickness of the final membrane. The EPDM rubber may be obtained in an un-polymerized form and mixed with a suitable vulcanizing or curing agent.

The electrode is dipped in the EPDM solution and air-dried before it is placed in a forced-air convection oven at a temperature of 150-200° C. for 1-5 hours to cure the rubber. Depending on the concentration of the rubber solution, a membrane thickness between 0.05 μm to 5 μm may be formed that is mechanically stable while allowing active ions in an electrolyte solution to pass through. The EPDM rubber is unaffected by highly alkaline aqueous solutions typically used in NiMH electrolytes.

Example 2: Measuring the Permeable Membrane

The quality of the membrane may be tested by immersing a sample electrode of a size 2.5 cm×5 cm in a 1N solution of KOH in water, with a counter-electrode of uncoated nickel foam. Connections are made to both electrodes with a multi-frequency LCR meter to measure the complex impedance of the electrode with active material. In one example, low-Q capacitive impedance in the range of 100 μF is measured for an active electrode area of 6.25 cm$^2$. This capacitance is relatively constant over a frequency range between 100 Hz to 10 KHz, confirming that the rubber membrane is the dominant component of an equivalent electronic circuit, while the measured parallel resistive impedance indicates that ions in solution are able to traverse the membrane easily.

The details given here are relevant to design and construction of a NiMH type of cell, but variations of materials and methods may be used to adapt the invention to different chemistries without departing from the claimed invention.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. An electrode comprising:
a high-porosity metal current collector;
an active material coating the metal current collector; and
a self-supporting synthetic membrane coating the active material,
wherein the electrode is configured to allow flow of a fluid electrolyte through the electrode.

2. The electrode of claim 1, wherein the synthetic membrane completely coats the active material.

3. The electrode of claim 1, wherein the synthetic membrane comprises ethylene propylene diene monomer rubber, polyvinylidene fluoride, or a fluoropolymer elastomer.

4. The electrode of claim 1, wherein the high-porosity metal current collector has a porosity between 50% and 65%, between 65% and 80%, or between 80% and 90%.

5. The electrode of claim 1, wherein the active material acts as an anode active material.

6. The electrode of claim 1, wherein the active material acts as a cathode active material.

7. The electrode of claim 1, wherein the synthetic membrane expands or contracts elastically to accommodate changes in volume of the active material.

8. The synthetic membrane of claim 7, wherein the membrane exerts near-constant containment force on the active material.

9. The electrode of claim 1, wherein the synthetic membrane comprises a semi-permeable barrier that allows passage of ions or small molecules but not solid particles.

10. The electrode of claim 1, wherein the synthetic membrane has a thickness between 100 and 1000 nanometers, 1000 and 2000 nanometers, or 2000 and 5000 nanometers.

* * * * *